(No Model.)

H. E. KIRSTEIN & E. DE CELLES.
EYEGLASSES.

No. 465,821. Patented Dec. 22, 1891.

WITNESSES:
F. Norman Dixon.
J. Howard Morris.

H. E. Kirstein
Ernest DeCelles
INVENTORS
By Their Attorneys
Wm. C. Strawbridge
J. Bonsall Taylor

UNITED STATES PATENT OFFICE.

HENRY E. KIRSTEIN, OF ROCHESTER, NEW YORK, AND ERNEST DE CELLES, OF SOUTHBRIDGE, MASSACHUSETTS; SAID DE CELLES ASSIGNOR TO SAID KIRSTEIN.

EYEGLASSES.

SPECIFICATION forming part of Letters Patent No. 465,821, dated December 22, 1891.

Application filed June 9, 1891. Serial No. 395,722. (No model.)

*To all whom it may concern:*

Be it known that we, HENRY E. KIRSTEIN, a citizen of the United States, residing in the city of Rochester, in the State of New York, and ERNEST DE CELLES, likewise a citizen of the United States, residing at Southbridge, in the State of Massachusetts, have jointly invented certain new and useful Improvements in Eye Glasses, of which the following is a specification.

Our invention relates generally to eye glasses of the class in which the connecting-bow is made adjustable to permit of movement of the lenses toward or from each other.

It is the object of our invention to provide an eye glass frame which, while permitting of a wide range of adjustability as to the distance between the lenses, is neat in appearance, compact in size, and composed of relatively few parts.

A further object is the application and employment in connection with an eye glass of the foregoing character of nose-pieces capable of adjustment.

A further object is to so mount or apply the bow or bridge as to render it capable of movement forward out of the plane of the lenses if desired, to clear the eyebrows of the wearer.

A preferred form of a convenient embodiment of our invention is represented in the accompanying drawings and herein described, the particular subject matter claimed as novel being hereinafter definitely specified.

Figure 1:
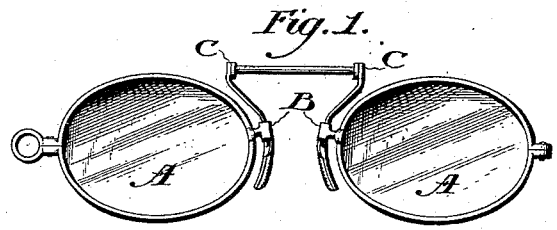
Figure 2:
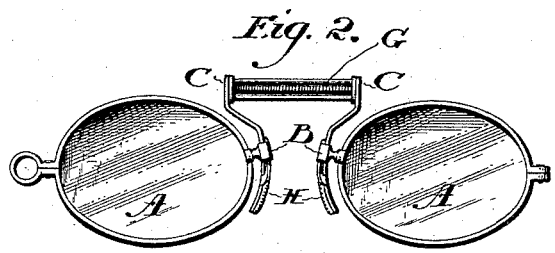
Figure 3:
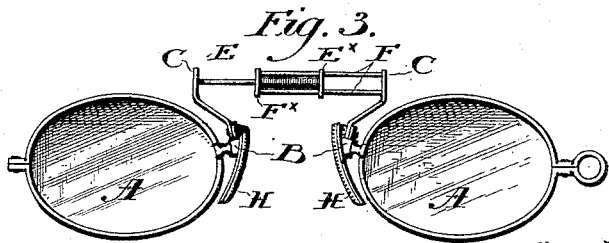
Figure 5:
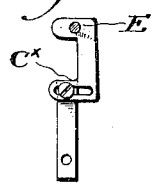
Figure 4:
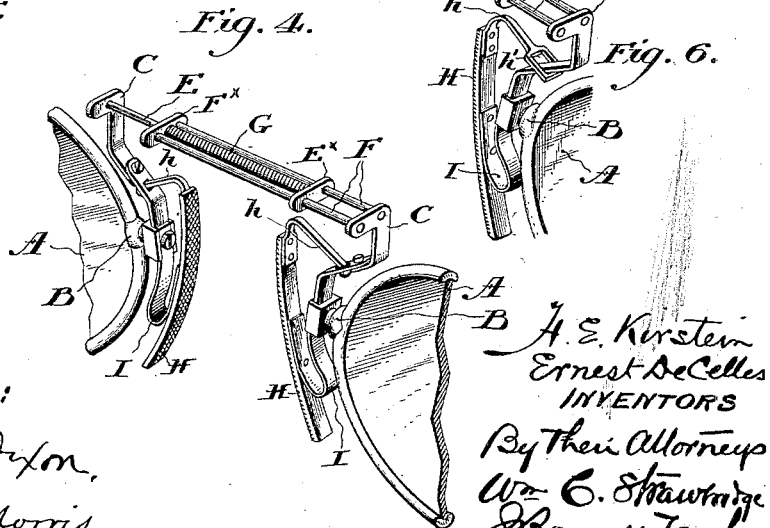
Figure 6:
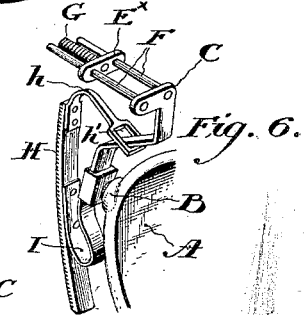

In the drawings, Figures 1 and 2 are front elevational views of eye glasses illustrated as provided with the slide-pins hereinafter described. Fig. 3 is a rear elevational view of the glasses of Fig. 2, illustrating however, the lenses as drawn away from each other and the bridge-spring in consequence compressed. Fig. 4 is an enlarged fragmentary perspective view of the bridge, illustrating the employment both of jointed bridge side bars, and of adjustable nose pieces. Fig. 5 is a detail elevational view of a bridge side bar formed in two parts connected by a stud and slot connection. Fig. 6 is a fragmentary perspective detail of the lens frames illustrating particularly a modified form of adjustable nose piece.

Similar letters of reference indicate corresponding parts.

In the drawings, A A are the lenses of the glasses shown, and B B are the clamp posts projecting toward each other from the inner ends of said lenses.

C C are what we term the bow or bridge side-bars, each of which consists of a bar of metal secured as to its lower end to a clamp post, and extending upwardly any desired distance, but preferably to a point slightly above the upper edges of the lenses. The upper portions of the bars C C are preferably inclined away from each other as shown so as to follow to some extent the outline of the adjacent lenses, and also to permit of the employment of the longest possible spring and slide pins, whereof hereinafter.

The bridge or bow proper is completed by connecting the upper portions of the two bridge side bars. This connection we prefer to form as follows:

E is a slide pin projecting from the upper end of one bar C, and F F are two slide pins similarly projecting from the upper end of the other bar C. The pins F F meet or overlap so to speak, the pin E, and one of said pins F lies on each side of the pin E. The extremity of the pin E is equipped with a yoke or cross head $E^\times$ which embodies two apertures or bearings through which the pins F F pass,—and the extremities of the pins F F are equipped with a common yoke or cross head $F^\times$ which embodies an aperture or bearing through which the pin E passes. By this means the pin E and the pins F F are connected permanently with each other but are at the same time free to slide longitudinally past each other upon their respective yokes, by virtue of which sliding action the approach and separation of the lenses become possible.

It being desirable in order that the nose pieces should firmly clasp noses of any size to which they may be applied that the lenses should normally set closely together, and be separated only against the stress of a spring,— we apply a spring in connection with the pins in such manner as to tend to draw the lenses and nose pieces together. In the drawings we show an expansive spiral spring G as encircling the outer portion of the pin E and abutting as to its respective extremities against the yokes $E^\times$ and $F^\times$, so that the expansive thrust of such spring operates to occasion the separation of said yokes and consequently the mutual approach of the lenses. The employment of the two yokes $E^\times$ $F^\times$ and the two pins F F in connection with the pin E, renders the connection not only very firm and durable, but also adapts it to have a very smooth and uniform sliding action in which binding of the parts is impossible.

The three pins E F F are in our improved eye glass preferably placed all in the same horizontal plane, in consequence of which arrangement two of the pins are concealed from view behind the pin in front,—with the result that with the strength and smooth action of the sliding connection described is combined that neatness of appearance which is a great desideratum in the use of eye glasses.

H H are the nose pieces or plates which present directly against the nose of the wearer. These nose pieces are of any preferred material and construction.

I I are nose piece springs, each consisting of a band of spring metal bent to a U form, each attached at its inner end to an adjacent clamp post and each attached at its outer end to the central portion of the back of the nose piece which it supports. This arrangement, in the play afforded by the springs I, permits the nose pieces to be moved bodily toward and from each other, apart from any movement of the lenses or their frames, and also permits the rocking of the nose pieces upon said springs as pivots. To limit the extent of said throw or rocking movement we equip the upper end of each nose piece with a rearwardly extending tongue $h$, and engage each tongue with the nearest adjacent side bar C, whereby the rocking movement of said nose pieces is to such extent limited. Thus, in Fig. 4 we show each tongue $h$ as passing through an aperture in the adjacent side bar, to the rear of which side bar each tongue is equipped with a hook by which its withdrawal from said aperture is prevented; while in Fig. 6 we show each tongue $h$ as provided with a ring $h'$ surrounding its adjacent side bar.

To render the bridge or bow capable of being moved forward to clear or avoid the eye-brows of the wearer of the glasses, we prefer to form the bridge side bars C each with an intermediate joint,—that is to say, to form each bar of two pieces, and connect them at the point $c$ by a screw, which screw may be loosened to give the upper member of the bar the required set, and then tightened to retain said upper member in said set. When set, the two members constitute in effect one bar.

In Fig. 5 the upper portion or member of the two part bridge side bar embodies a lateral extension, $c^\times$, through the slot of which the screw engaged in the lower portion or member passes. By virtue of this slot the upper member can be slid bodily outward and inward as opposed to the pivotal motion characteristic of the joint of the bridge side bar of Fig. 4.

Having thus described our invention we claim and desire to secure by Letters Patent—

1. In an eye glass or spectacle frame, in combination, the bridge side bars, two companion slide pins projecting from one bar, one slide pin projecting from the other bar, a yoke connecting said two companion slide pins, with which yoke the single pin is in sliding engagement, a yoke connected with said single pin, with which last named yoke the companion pins are in sliding engagement, and a spring which tends to draw the bridge side bars together, substantially as set forth.

2. In an eye glass or spectacle frame, in combination, the bridge side bars, two companion slide pins projecting from one bar, a slide pin projecting from the other bar and lying between the two first named, a yoke connected with said two companion slide pins through which a single pin passes,—a yoke connected with said single slide pin through which the two companion slide pins pass, and a spring adapted to force said yokes apart, substantially as set forth.

3. In an eye glass or spectacle frame, in combination, two side bars adapted to be moved out of the plane of the lenses, a slide pin projecting from one side bar, a second slide pin projecting from the other side bar, yokes connecting said pins, and a spring which tends to draw the side bars together, substantially as set forth.

4. In an eye glass or spectacle frame, in combination, two side bars embodying joints or hinges, a slide pin projecting from one side bar,—a second slide pin projecting from the other side bar, yokes connecting said pins, and a spring adapted to draw the side bars together, substantially as set forth.

5. In an eye glass or spectacle frame, in combination: the two upwardly extending side bars embodying apertures or seats, a connection between said side bars, the movable nose pieces, and tongues projecting rearwardly from the nose pieces and engaging with the respective side bars, substantially as set forth.

6. In an eye glass or spectacle frame, in combination, the lenses, the clamp posts, a bridge adapted to be moved out of the plane of the lenses and to occupy various positions with reference to said plane, and means for securing said bridge in such positions of adjustment, substantially as set forth.

7. In an eye glass or spectacle frame, in combination, the lenses, the clamp posts, and a bridge mounted upon said clamp posts and adapted to be adjusted to a position out of the plane of the lenses, substantially as set forth.

In testimony that we claim the foregoing as our invention, we have hereunto signed our names.

HENRY E. KIRSTEIN.
    ERNEST DE CELLES.

Witnesses to the signature of Henry E. Kirstein:
 J. BONSALL TAYLOR,
 F. NORMAN DIXON.

Witnesses to the signature of Ernest De Celles:
 ISAAC ST. MARTIN,
 C. A. PAIGE.